United States Patent
Yun et al.

(10) Patent No.: US 9,193,403 B2
(45) Date of Patent: Nov. 24, 2015

(54) HUMANOID FALL DAMAGE REDUCTION

(71) Applicant: Honda Motor Co., Ltd., Tokyo (JP)

(72) Inventors: Seung-kook Yun, Cupertino, CA (US); Ambarish Goswami, Fremont, CA (US)

(73) Assignee: HONDA MOTOR CO., LTD, Tokyo (JP)

( * ) Notice: Subject to any disclaimer, the term of this patent is extended or adjusted under 35 U.S.C. 154(b) by 106 days.

(21) Appl. No.: 14/038,609

(22) Filed: Sep. 26, 2013

(65) Prior Publication Data
US 2014/0288705 A1 Sep. 25, 2014

Related U.S. Application Data

(60) Provisional application No. 61/803,533, filed on Mar. 20, 2013.

(51) Int. Cl.
*B62D 57/032* (2006.01)
*G06N 3/00* (2006.01)

(52) U.S. Cl.
CPC .............. *B62D 57/032* (2013.01); *G06N 3/008* (2013.01)

(58) Field of Classification Search
CPC .... B62D 57/032; B62D 57/02; B62D 57/022; B62D 57/00; G06N 3/00; G06N 3/008; G06N 3/02; G06N 3/08; G06N 3/084; G06N 3/086; G06N 3/088; G06N 3/12; G06N 3/126
USPC .......................................... 700/246, 253, 254
See application file for complete search history.

(56) References Cited

U.S. PATENT DOCUMENTS

| | | | |
|---|---|---|---|
| 6,064,167 A * | 5/2000 | Takenaka | B62D 57/032 318/568.12 |
| 6,902,015 B2 | 6/2005 | Furuta et al. | |
| 6,992,455 B2 | 1/2006 | Kato et al. | |
| 7,386,364 B2 | 6/2008 | Mikami et al. | |
| 7,761,184 B2 | 7/2010 | Moridaira et al. | |
| 8,332,068 B2 | 12/2012 | Goswami et al. | |
| 8,352,077 B2 | 1/2013 | Goswami et al. | |
| 2004/0060746 A1* | 4/2004 | Furuta | B25J 13/081 180/8.6 |
| 2005/0234593 A1* | 10/2005 | Goswami | B62D 57/032 700/245 |
| 2006/0011391 A1* | 1/2006 | Isozumi | B62D 57/032 180/8.1 |
| 2010/0057253 A1 | 3/2010 | Kwon et al. | |
| 2010/0292838 A1* | 11/2010 | Goswami | B25J 9/163 700/246 |
| 2012/0245734 A1 | 9/2012 | Yun et al. | |
| 2012/0316684 A1 | 12/2012 | Lee et al. | |

OTHER PUBLICATIONS

Fujiwara, K. et al., "An Optimal Planning of Falling Motions of a Humanoid Robot," *Proceedings of the 2007 IEEE/RSJ International Conference on Intelligent Robots and Systems*, Oct. 29-Nov. 2, 2007, pp. 456-462, San Diego, California, USA.

(Continued)

*Primary Examiner* — Stephen Holwerda
(74) *Attorney, Agent, or Firm* — Arent Fox LLP

(57) ABSTRACT

A robot controller controls a robot during a fall to reduce the damage to the robot upon impact. The robot controller causes the robot to achieve a tripod-like posture having three contact points (e.g., two hands and one foot) so that the robot motion in arrested with its center of mass (CoM) high above the ground. This prevents a large impact caused by the transfer of potential energy to kinetic energy during the fall. The optimal locations of the three contacts are learned through a machine learning algorithm.

17 Claims, 5 Drawing Sheets

(56) References Cited

OTHER PUBLICATIONS

Fujiwara, K. et al., "Safe Knee Landing of a Human-size Humanoid Robot while Falling Forward," *Proceedings of 2004 IEEE/RSJ International Conference on Intelligent Robots and Systems*, Sep. 28-Oct. 2, 2004, pp. 503-508, Sendai, Japan.

Fujiwara, K. et al., "UKEMI: Falling Motion Control to Minimize Damage to Biped Humanoid Robot," *Proceedings of the 2002 IEEE/RSJ International Conference on Intelligent Robots and Systems*, Oct. 2002, pp. 2521-2526, Lausanne, Switzerland.

\* cited by examiner

HUMANOID FALL DAMAGE REDUCTION

RELATED APPLICATIONS

This application claims the benefit of U.S. Provisional Patent Application No. 61/803,533 entitled "Tripod Fall: Theory and Experiments of a Novel Approach to Humanoid Fall Damage Reduction," to Seung-kook Yun and Ambarish Goswami, filed on Mar. 20, 2013 which is incorporated by reference herein in its entirety.

BACKGROUND

The issue of safety and robust operation is a major challenge to integrating humanoid or other legged robots into human environments. Particularly, given the size, weight, and fragility of such robots, a fall can be a significant threat to safe and smooth operation of humanoid robots and to safety of objects and people in their surroundings. While robot balance controllers are designed to reduce the likelihood of the robot falling over, in some cases the fall is inevitable and cannot be prevented. In these cases, it is desirable that humanoid robots be equipped with a comprehensive fall management strategy to minimize damage to itself and surrounding objects and/or to prevent injury to people.

APPLICATION SUMMARY

A system, non-transitory computer-readable storage medium, and computer-implemented method is described for controlling a robot during a fall to the ground. A state of the robot is determined following a determination that a fall cannot be prevented. The state of the robot is mapped to learned control parameters corresponding to the state of the robot. The learned control parameters control the robot to impact the ground with a foot and two hands such that the robot reaches a balanced position supported by the foot and the two hands that prevents its torso from impacting the ground. The robot is controlled during the fall based on the learned control parameters. In one embodiment, the learned control parameters are learned in a machine learning algorithm to achieve a minimum realizable impact force of the robot resulting from the fall given the state of the robot and given a limited set of controllable attributes of the robot.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Embodiments are now described with reference to the figures where like reference numbers indicate identical or functionally similar elements. Also in the figures, the left most digits of each reference number corresponds to the figure in which the reference number is first used.

A robot controller includes a tripod fall controller that controls a robot during a fall to reduce the damage to the robot upon impact. The robot controller causes the robot to achieve a tripod-like posture with three contact points (e.g., two hands and one foot) so that the robot is supported by the contact points motion is arrested with its center of mass (CoM) high above the ground and preventing its torso from impacting the ground. This prevents a large impact caused by the transfer of potential energy to kinetic energy during the fall. In one embodiment, the optimal locations of the three contacts are learned through a machine learning algorithm.

System Architecture

Figure 1:
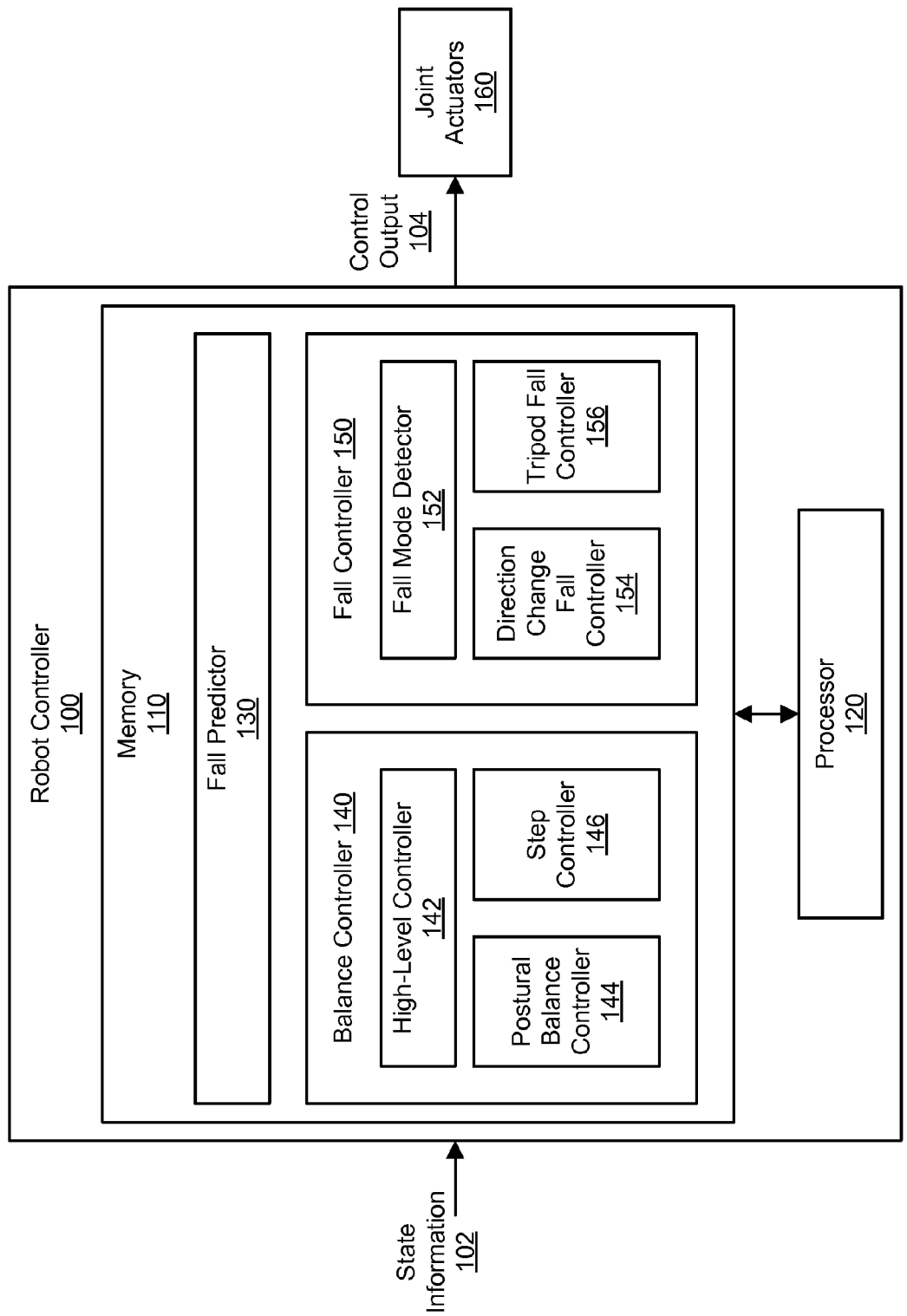
FIG. 1 is a block diagram of a robot controller in accordance with an embodiment.

FIG. 1 is a block diagram illustrating an embodiment of a robot controller 100 for controlling motion of a robot. In one embodiment, the robot controller 100 comprises a processor 120 and a memory 110. The processor 120 processes data signals and may comprise various computing architectures such as a complex instruction set computer (CISC) architecture, a reduced instruction set computer (RISC) architecture, or an architecture implementing a combination of instruction sets. Although only a single processor 120 is shown in FIG. 1, multiple processors may be included. The processor 120 comprises an arithmetic logic unit, a microprocessor, a general purpose computer, or some other information appliance equipped to transmit, receive and process electronic data signals from the memory 110 or from external inputs.

The memory 110 comprises a non-transitory computer-readable storage medium that stores computer-executable instructions and computer-readable data. The instructions may comprise code for performing any and/or all of the techniques described herein. The memory 110 may furthermore temporarily or persistently store data inputted to the robot controller 100 (e.g., station information 102), data to be outputted by the robot controller 100 (e.g., control output 104), and any intermediate data used to carry out the process steps of the robot controller 100 described herein. Memory 110 may be a dynamic random access memory (DRAM) device, a static random access memory (SRAM) device, Flash RAM (non-volatile storage), combinations of the above, or some other memory device known in the art. In operation, the processor 120 loads the computer-executable instructions and/or data from the memory 110 to carry out the process steps described herein.

The robot controller 100 may include more or less components than those shown in FIG. 1 without departing from the scope of the present invention. For example, the robot controller 100 may include additional memory, such as, for example, a first or second level cache, or one or more application specific integrated circuits (ASICs). In other embodiments, the robot controller 100 may be implemented entirely in hardware.

In one embodiment, the robot controller 100 controls a humanoid biped robot having a human-like joint configuration (e.g., six degrees of freedom in each leg) and a total mass of, for example, between 40 and 60 kilograms. In alternative embodiments, the robot may be a legged robot having more than two legs (e.g., a quadruped, hexapod, etc.) or the robot may be a biped robot which is not necessarily humanoid (e.g., a bird-like robot, a robot without an upper body, etc.). The robot controller 100 receives state information 102 of the robot. This state information 102 can include, for example, sensed information pertaining to the positions and/or velocities of different components of the robot and motion instructions (e.g., from an input controller) indicating how the robot should move. For example, the motion instructions may direct the robot to, for example, stay stationary, walk in a particular direction, move or rotate its limbs or trunk according to a particular motion, etc. These motion instructions may be irrespective of balance considerations or other physical constraints on the robot. Such motion instructions may be inputted by a human through a control mechanism, or may be generated automatically by an artificial intelligence system that controls motion decisions of the robot. In one embodiment, the state information 102 is defined in terms of a motion of the feet (e.g., configuration and velocity), angular momentum about the robot's center of mass, center of mass position and velocity, and joint accelerations. In some situations, the motion instructions of the state information 102 can indicate that the robot should remain stationary (i.e., the desired angular momentum and center of mass velocity should ideally be zero).

Based on the state information 102, the robot controller 100 generates a control output 104 that controls joint actuators 160 which cause the robot to move. In one embodiment, the control output 104 comprises a vector of joint torques indicating the torques that the actuators will apply to each of the robot's joints. If the motion instructions would not result in the robot losing balance based on the sensed data, then the control output 104 controls the joint actuators 250 to carry out the received motion instructions. On the other hand, if the robot controller 100 determines that the motion instructions would cause the robot to lose its balance and topple over given the current state information 102, the robot controller 100 generates a control output 104 such that the resulting motion (an "admissible motion") is optimally close to the desired motion while still allowing the robot to maintain balance. If no admissible motion exists that enables the robot to maintain its balance, the robot determines that a fall is inevitable and controls its motion during the fall to attempt to reduce damage to itself and/or to surrounding objects, or prevent injury to people. The robot controller 100 may process the state information 102 and generate control output 104 periodically (e.g., once every millisecond) such that the robot continuously updates its control strategy even as its motion instructions change or when external forces acting on the robot change.

In one embodiment, the memory 110 stores computer-executable instructions embodied as a fall predictor 130, a balance controller 140, and a fall controller 150. The fall predictor 130 continuously monitors the state information 102 of the robot and determines when a fall is inevitable. For example, in one embodiment, the fall predictor module 130 determines when the robot's state crosses a "fall trigger boundary." Generally, the fall trigger boundary represents a boundary enclosing a region of the robot's state space in which the balance controller 140 is able to maintain balance of the robot, and thus a fall cannot be avoided. Further details regarding the fall trigger boundary is described in U.S. Pat. No. 8,332,068 entitled "Intelligent Stepping for Humanoid Fall Direction Change" to Goswami, et al., filed on Nov. 2, 2009 and issued on Dec. 11, 2011, and U.S. Pat. No. 8,352,077 entitled "Inertia Shaping for Humanoid Fall Direction Change" to Goswami, et al., filed on Nov. 2, 2009 and issued on Jan. 8, 2013, the contents of which are each incorporated by reference herein. As long as the fall predictor 130 determines that the robot can maintain its balance, the balance controller 140 controls movement of the robot. When the fall predictor 130 determines that a fall is unavoidable, the robot controller 100 gives control to the fall controller 150 to control the robot during the fall.

In one embodiment, the balance controller 140 comprises a high-level controller 142, a postural balance controller 144, and a step controller 146. The high-level controller 142 determines whether motion of the robot is controlled by the postural balance controller 144 or the step controller 146. Generally, the high-level controller 142 gives control to the postural balance controller 144 when the high-level controller 142 determines that the robot is not taking a step and does not need to take a step to maintain balance. The high-level controller 142 generally gives control to the step controller 146 when the robot is stepping or when it detects a trigger condition indicating that the robot cannot maintain balance without taking a step. For example, in one embodiment, the high-level controller 142 determines a generalized foot placement estimator (GFPE) based on the current dynamic state of the robot (e.g., positions and/or velocities of its joints). The GFPE represents a point on the ground surface where the robot will be in a balanced position if its foot is placed there. Generally when the robot is balanced, the GFPE will already be under the robot's center of mass and therefore the robot need not take any action to retain balance. However, if the robot becomes unstable (e.g., in response to an external disturbance), the GFPE will move away from under the robot's CoM and the robot may need to take some action to retain balance, such as making a postural change (e.g., rotating about the trunk) or taking a step. Calculation of the GFPE is described in further detail in U.S. patent application Ser. No. 13/425,383 entitled "Humanoid Push Recovery on Level and Non-Level Ground" to Seung-kook Yun, et al. filed on Mar. 20, 2012, the content of which is incorporated by reference herein.

In one embodiment, both the postural balance controller 144 and the step controller 146 of the balance controller 140 control the rate changes of linear and angular momenta according to the following rules:

$$\dot{k}_d = \Gamma_{11}(k_d - k) \quad (1)$$

$$\dot{l}_d/m = \Gamma_{21}(\dot{r}_{G,d} - \dot{r}_G) + \Gamma_{22}(r_{G,d} - r_G) \quad (2)$$

where k and $\dot{k}$ are centroidal angular momentum and its rate change, m is the total mass of the robot, $r_{G,d}$ and $\dot{r}_G$ are the locations and the velocity of the center of mass. $\dot{k}_d$ and $\dot{l}_d$ are the desired rates of change of centroidal angular and linear momenta, respectively, and $r_{G,d}$ is the desired center of mass position. $\Gamma_{ij}$ represents a 3×3 diagonal matrix of feedback gain parameters. The balance controller 140 determines if the desired momentum rates are admissible, which are defined as physically realizable, and controls (e.g., optimizes) joint torque according to the admissible momentum.

Figure 2A:
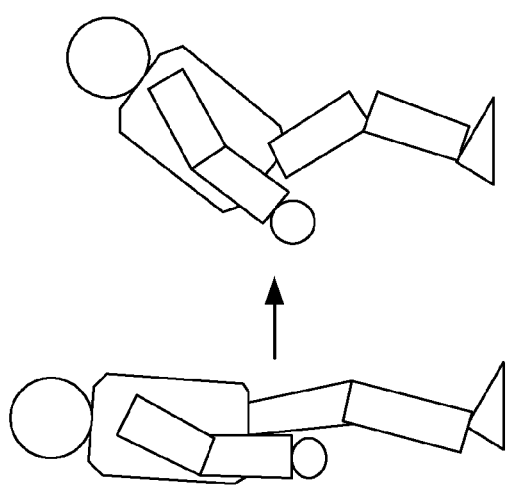
FIG. 2A is a diagram illustrating movement of a robot in response to a push using a postural balance controller, in accordance with an embodiment.
Figure 2C:
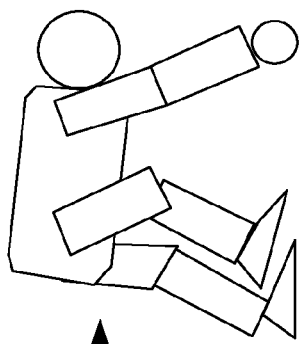
FIG. 2C is a diagram illustrating movement of a robot in response to a push using a tripod fall controller, in accordance with an embodiment.
Figure 2B:
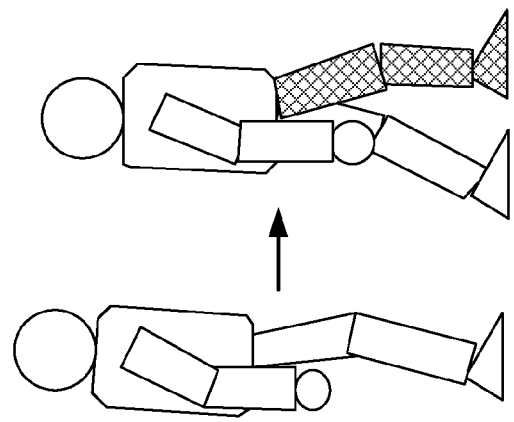
FIG. 2B is a diagram illustrating movement of a robot in response to a push using a step controller, in accordance with an embodiment.

Applying the principles above, the postural balance controller 144 generally respects linear momentum in preference to angular momentum. Thus, a biped robot can recover balance from an external push by generating angular momentum, if necessary, as shown in FIG. 2A. In contrast, when a push is so large that a robot cannot recover balance solely by postural movement (i.e., by respecting linear momentum), the step controller 146 takes control of the robot. Here, the step controller operates to respect angular momentum over linear momentum which results in the linear movement of the center of mass involving a step as shown in FIG. 2B.

The different push recovery behaviors can be controlled by different choices of the gain matrices. For example, a small $\Gamma_{11}$ and large values of $\Gamma_{21}$ and $\Gamma_{22}$ will generate the motion shown in FIG. 2A after a push from behind. Normally the desired angular momentum is set to zero to keep the robot upright, and the bending motion such as FIG. 2A generates angular momentum which contributes to the error in $\dot{k}$. However, the generated angular momentum helps to pull the center of mass backward and the small $\Gamma_{11}$ makes the controller 100 almost ignore the angular momentum error. On the other hand, a large $\Gamma_{11}$ causes the robot to respect angular momentum more strictly. When the desired angular momentum is zero, which is reasonable for stepping motion, the controller 100 would move the robot center of mass position rather than bend the upper body. The robot generates linear momentum which causes error for $\dot{l}$, however the error is scaled down because of the small $\Gamma_{21}$ and $\Gamma_{22}$, and the robot controller 100 prioritizes the desired angular momentum over the desired linear momentum resulting in the motion of FIG. 2B. Additional details regarding embodiments of a postural balance controller 144 and step controller 146 can be found in U.S. patent application Ser. No. 13/580,477 entitled "Momentum-Based Balance Controller for Humanoid Robots On Non-Level and Non-Stationary Ground," to Sung-Hee Lee, et al. filed on Feb. 24, 2011 and U.S. patent application Ser. No. 13/425,383 entitled "Humanoid Push Recovery on Level and Non-Level Ground" to Seung-kook Yun, et al. filed on Mar. 20, 2012, the contents of which are each incorporated by reference herein.

As will be understood to those of ordinary skill in the art, the postural balance controller 144 and step controller 146 are not necessarily independent of each other. Rather the balance controller 144 and step controller 146 may be implemented as an integrated controller in which the different behaviors are controlled by varying the feedback parameters as discussed above.

When the fall predictor 130 determines that the robot is about to fall, the fall controller 150 takes control of the robot and controls movement of the robot throughout the fall in order to minimize damage to the robot and/or its surroundings, prevent injury to people. In one embodiment, the fall controller 150 comprises a fall mode detector module 152, a direction change fall controller 154, and a tripod fall controller 156. The fall mode detector module 152 estimates and analyzes various characteristics of the robot's state and its surroundings in order to determine whether to apply the direction change fall controller 154 or the tripod fall controller 156. For example, the fall mode detector 152 may analyze the robot's state of ground contact (single support or double support), height of its center of mass from ground, the center of mass velocity, lean angle, direction of fall, the length of time the falling robot takes to touch the ground, etc. The fall mode detector 152 also determines whether there are objects in the robot's immediate surrounding area which it is likely to come in contact with during the fall. If objects or people are detected in its vicinity, the direction change fall controller 134 is applied to attempt to control the direction of the fall to avoid the surrounding objects or people. In one embodiment, for example, the direction change fall controller uses information about the locations and sizes of surrounding objects or people to formulate a direction-changing fall control strategy. Examples of a direction change fall controller 154 are described in U.S. Pat. No. 8,332,068 entitled "Intelligent Stepping for Humanoid Fall Direction Change" to Goswami, et al., filed on Nov. 2, 2009 and issued on Dec. 11, 2011, and U.S. Pat. No. 8,352,077 entitled "Inertia Shaping for Humanoid Fall Direction Change" to Goswami, et al., filed on Nov. 2, 2009 and issued on Jan. 8, 2013, the contents of which are each incorporated by reference herein.

Alternatively, if the fall mode detector 152 determines that there are no surrounding objects or humans in danger from the falling robot, the fall mode detector 152 instead applies the tripod fall controller 156 to employ a control strategy designed to reduce the mechanical damage to the robot itself. In one embodiment, the tripod fall controller 156 applies a "tripod fall" control algorithm that controls the robot to fall such that the robot contacts the ground by three consecutive contacts of a foot and two hands to the floor. The robot lands in a balanced position with the center of mass above the impact surface and with the robot having three contact points with the surface (e.g., one foot and two hands). By causing the robot to land in this position, the robot avoids a complete fall to the ground and the robot's potential energy is not fully converted to kinetic energy. This reduces the impact velocity of the robot and consequently reduces the impact force. In one embodiment, to minimize this impact force, the robot is controlled to take a long step toward the GFPE location, or as near to it as physically realizable, and extend the arm so that it hits the ground at approximately perpendicular. Example embodiments of a control algorithm applied by the tripod fall controller 156 are described in further detail in the description below.

In one embodiment, the tripod fall controller 156 operates according to similar control principles as the postural balance controller 144 and step controller 146 described above. As shown in FIG. 2C, the tripod fall motion includes both stepping and bending of the trunk of the humanoid. Therefore simply prioritizing one momentum over the other cannot generate the desired tripod-like motion. Instead, the tripod fall controller 154 applies approximately balanced gains for the linear momentum and the angular momentum, and either or both of the momenta have an error, defined as the discrepancy between the actual momentum and the admissible momentum. In one embodiment, the tripod fall controller 156 can be implemented an integrated controller together with the postural balance controller 144 and/or step controller 146, where the different control strategies of the different controllers are achieved in part by the varying the feedback parameters $\Gamma_{ij}$ as discussed above and enforcing any additional control parameters discussed below.

In one embodiment, the tripod fall controller 156 controls the robot during the fall based on a model of the robot as a rolling polyhedron with a three-dimensional convex hull composed of all the outer vertices, edges, and faces (assuming no curved surface). The tripod fall controller 156 can then be modeled as changing the polyhedra so that the robot performs a planned roll with the three contacts by changing its kinematic configuration. While the embodiments described herein use only one foot and two hands, the concept can be generalized to controlling a rolling polyhedra so that the 3D convex hull morphs consecutively. For example, a complete 360-degree forward rolling motion may be achieved by modeling the humanoid as the corresponding polyhedra and controlling it to roll over the ground until the two feet lands on the ground again after rolling. In other embodiment, the tripod fall controller 156 can instead cause the robot to achieve a balanced position with two feet and one hand.

Figure 3:
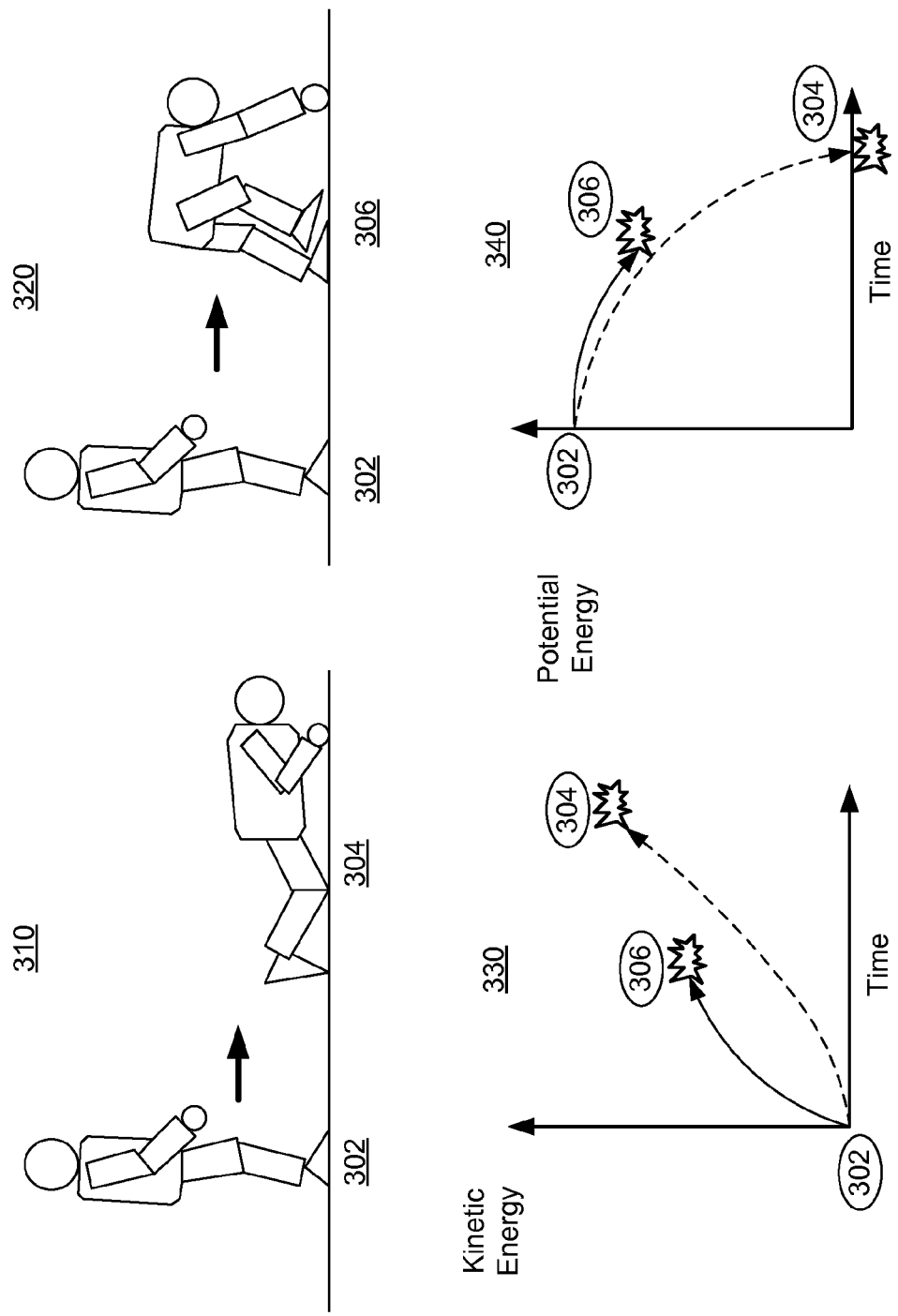
FIG. 3 is a diagram illustrating the kinetic and potential energies of a robot during a fall according to different fall control strategies, in accordance with an embodiment.

FIG. 3 illustrates the benefit of applying the tripod fall control strategy of the tripod fall controller 156 in terms of the potential energy and kinetic energy of a robot during a fall. In diagram 310, a fall scenario is illustrated without employing the fall control strategy of the tripod fall controller 156. Here, the robot starts in an upright position 302. As illustrated in graphs 330 and 340, the robot in the initial state 302 has no kinetic energy because it is stationary and has a potential energy related to the distance from the robot's center of mass to the ground. An external disturbance is then applied to the robot (e.g., a push from behind strong enough to topple the robot). Without any control from the tripod fall controller 156, the robot lands in a position 304. During the fall, the potential energy decreases to zero or near zero as the center of mass approaches the ground. The potential energy is converted to kinetic energy and the kinetic energy increases throughout the fall until impact. Thus, the kinetic energy at impact is relatively high, thereby increasing the likelihood of damage to the robot.

Diagram 320 illustrates a fall scenario that employs the tripod fall control strategy of the tripod fall controller 156. Here, the robot again begins in an initial state 302. However, during the fall, the robot controls its motion such that it lands in a state with the center of mass substantially above the ground, balanced on two arms and one leg without its torso impacting the ground, as shown in configuration 306. Thus, the robot impacts the ground and reaches a stabilized position before all of its potential energy is converted to kinetic energy. As a result, the kinetic energy is reduced at impact in comparison to the robot landing in configuration 304. The lower kinetic energy at impact reduces the likelihood of damage to the robot.

Figure 4:
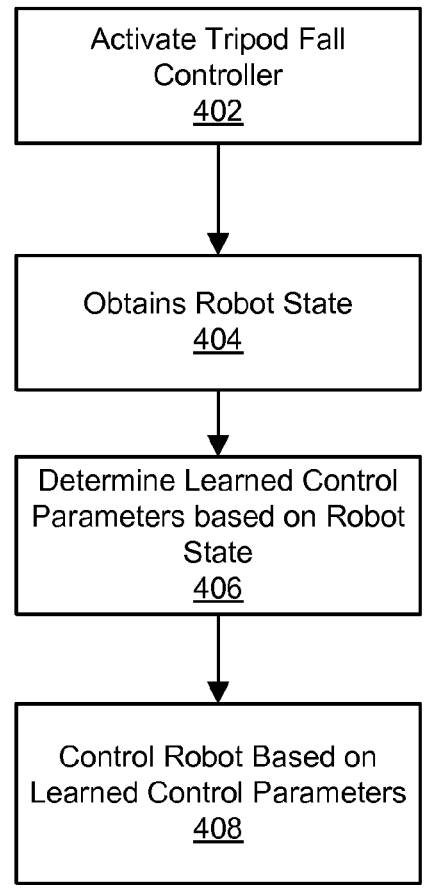
FIG. 4 is a flowchart illustrating a process for controlling a robot during a fall to minimize or reduce damage to the robot, in accordance with an embodiment.

FIG. 4 illustrates an embodiment of a process for controlling the robot during a fall using a tripod fall control strategy. The robot controller 100 activates 402 the tripod fall controller 156 when it detects that a fall is inevitable and seeks to reduce damage to the robot. The robot then obtains 404 a representation of the robot state (e.g., the positions and/or velocities of the robot's joints). In one embodiment, the GFPE provides a representation of the robot state. As described above, the GFPE represents a predicted location on the ground where the center of mass of the robot will stop vertically above the GFPE location if the robot takes a step to this location, when the robot is modeled as a rimless wheel. The GFPE is defined on level and non-level ground, is stationary, and is uniquely defined for any given state of the robot during the fall. The tripod fall controller 156 then determines learned control parameters based on the robot state. For example, in one embodiment, the tripod fall controller 156 stores a table mapping each possible robot state (represented, for example, by the GFPE) to a set of control parameters that control the robot during the fall. Alternatively, the control parameters can be determined in real-time as a function of the robot state based on learned relationships between the robot state and desired fall parameters. The tripod fall controller 156 then controls 408 the robot during the fall according to the learned control parameters corresponding to the robot state.

In one embodiment, the control parameters corresponding to the robot state include an x-y stepping location on the floor and two shoulder angles for each arm. In this embodiment, other parameters of the robot are fixed. For example, in one embodiment, regardless of the determined robot state, the robot locks the leg joints and fully stretches and locks the arms and wrists during the fall. In alternative embodiments, these parameters may also vary based on the obtained robot state.

In another alternative embodiment, a different representation of the robot state may be used instead of the GFPE to determine the control parameters during the fall. For example, in various embodiments, the control parameters may be determined based on one or more other state parameters of the robot. Generally, it is desirable that this representation be unique and time invariant for any given state of the robot.

In yet another embodiment, the tripod fall controller 156 can further reduce the impact force by applying impedance control of the contacting foot and hand at the impact time.

Due to the highly non-linear dynamics of a falling humanoid, a learning algorithm is used to find the best control parameters to apply during the fall based on the robot's state (e.g., GFPE). For example, in one embodiment, the learning algorithm learns, for any given robot state, which control parameters will achieve a minimum realizable impact force of the robot resulting from the fall given the state of the robot and given a limited set of controllable attributes of the robot. While this learning process can be substantially more efficient when the control parameters are limited to a smaller set (e.g., to the shoulder angles and stepping location discussed above), the learning algorithm may be applied similarly to more complex control strategies based on any number of the degrees of freedom of the robot and/or other parameters. For efficient training, the entire states of the robot can be projected on the GFPE as described above. In this embodiment, the control parameters are then mapped to different possible GFPEs in each training case.

The largest component of the impact force is generally absorbed by the hand that hits the ground first. To minimize impact force, the learned shoulder angles of the shoulder on the same side as the hand that impacts the ground first will generally cause the arm hit the ground at an almost perpendicular angle to the ground. This lets the hand closer to the ground make impact as soon as possible in order to minimize the landing speed of the robot at the instant of ground contact.

Figure 5:
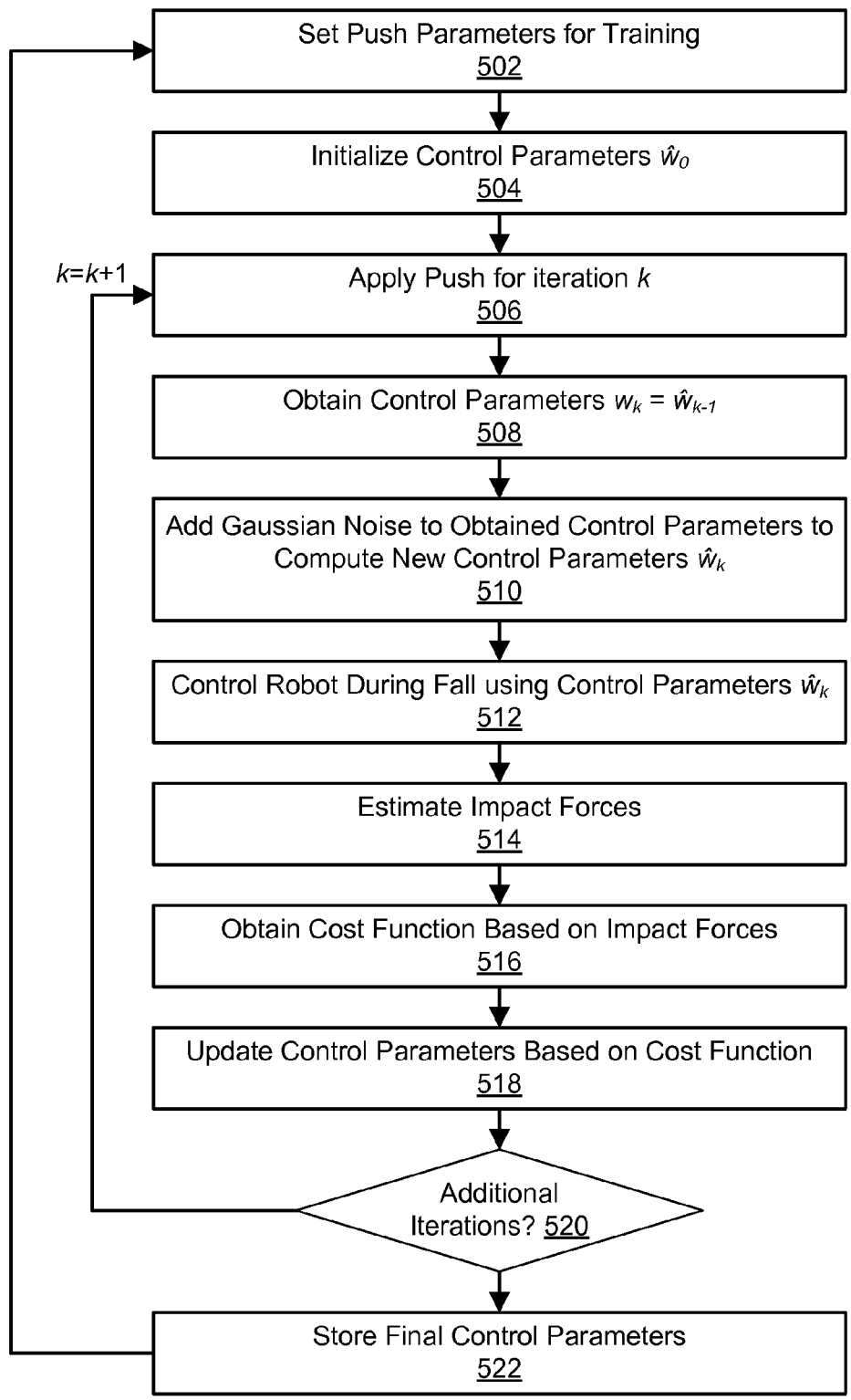
FIG. 5 is a flowchart illustrating a process for training a fall control strategy of a robot controller, in accordance with an embodiment.

FIG. 5 illustrates an embodiment of a process for learning the control parameters applied by the tripod fall controller 156. In one embodiment, the learning algorithm comprises a reinforcement learning algorithm based on a gradient descent method. The push parameters for training are first configured 502. For example, in one embodiment, training is performed for a plurality of different push magnitudes and directions, each resulting in a different GFPE or other robot state representation. In one embodiment, the various pushes are all applied to the center of the humanoid trunk when the robot is standing still on both legs, although different push locations may be used. Control parameters are then initialized 504 for training. In one embodiment, for example, the x-y stepping location is initialized to a location half the distance between the initial swing foot location and the GFPE. Furthermore, in one embodiment, the shoulder angles are initialized to angles that cause the robot arms to be perpendicular to the body when viewed from the side.

In a current iteration k (where k=1 for the first iteration), the push is applied 506 to the robot in accordance with the configured push parameters. The control parameters 508 are the obtained for the current iteration k. For example, in the first iteration k=1 these control parameters will be the set to the initial values $w_1 = \hat{w}_0$ discussed above. In subsequent iterations, the control parameters are set to the control parameters applied in the previous iteration $w_k = \hat{w}_{k-1}$. Gaussian noise is then added 510 to the obtained control parameters as:

$$\hat{w}_k = w_k + Z_k \quad (3)$$

$$Z_k \sim N(0, \sigma^2) \quad (4)$$

where $w_k$ is the current vector of the control parameters and $\hat{w}_k$ is the new parameters with the noise $Z_k$ and variance $\sigma^2$.

The robot is controlled 512 during the fall based on the new control parameters $\hat{w}_k$ and the impact forces are estimated 514 when the robot impacts the ground. For example, in one embodiment, maximum impact forces corresponding to the swing foot $F_k^{foot}$ and the landing hand $F_k^{hand}$. These impact forces may be measured directly by sensors on the feet and hands, or may be estimated based on other measured characteristics such as the angular velocity of the trunk. A cost function is then calculated 516 based on the estimated impact forces. For example, in one embodiment, the cost function $g_k(\cdot)$ is defined as the sum of the maximum impact forces:

$$g_k(w_k) = \alpha F_k^{foot} + \beta F_k^{hand} \quad (5)$$

when $$z_k^{CoM} < Z_{thresh} \quad (6)$$

otherwise, $$g_k(w_k) = \alpha F_k^{foot} + \beta F_k^{hand} + \Gamma \quad (7)$$

where $\alpha$ and $\beta$ are positive constants.

To penalize the case in which the robot cannot stabilize the tripod posture and falls to the ground, the constant penalty $\Gamma$ is added when the height of the center of mass $z_k^{CoM}$ is lower than a threshold value $Z_{thresh}$.

The control parameters are then updated 518 by a gradient descent method:

$$\Delta w_k = -\eta (g_k(w_k + Z_k) - g_k(w_k)) e_N \quad (8)$$

where $\eta$ is a matrix of learning rates. $e_N$ is an eligibility vector, updated by:

$$e_{k+1} = e_k + \frac{Z}{\sigma^2}, \quad (9)$$

where k is a number of iterations.

The algorithm then determines 520 if additional iterations of the learning algorithm should be performed for the current push parameters. In one embodiment, a fixed number of iterations may be performed (e.g., 100-200 iterations). In another embodiment, iterations may be performed until a stopping criterion is reached indicating that control parameters have sufficiently converged. If further iterations are to be performed, the algorithms repeats from step 506, wherein the obtained control parameters $w_k$ for iteration k are set to the control parameters applied in the previous iteration $\hat{w}_{k-1}$. If the additional iterations are not needed, the learned control parameters are stored 522 in association with the GFPE (or other state representation) corresponding to the configured push parameters. The process may then repeat to learn control parameters for different pushes having different angles and/or forces.

The learning algorithm described above serves to learn, for any given robot state (defined, for example, by GFPE) a set of control parameters that should be applied during the fall to minimize the impact force. Generally, it is found that impact force is minimized when the robot lands in the tripod fall position described above.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A computer-implemented method for controlling a robot during a fall to the ground, the method comprising:
   determining a state of the robot following a determination that a fall cannot be prevented;
   mapping, by a processor, the state of the robot to learned control parameters corresponding to the state of the robot, the learned control parameters indicating a learned stepping location of a free leg, a learned left shoulder angle for controlling a position of the left arm, and a learned right shoulder angle for controlling a position of the right arm, wherein the learned control parameters control the robot to impact the ground with a foot of the free leg and two hands such that the robot reaches a balanced position supported by the foot and the two hands that prevents its torso from impacting the ground;
   controlling the robot during the fall based on the learned control parameters to take a step with the free leg to the learned stepping location, to control the left arm to achieve the learned left shoulder angle, and to control the right arm to achieve the learned right shoulder angle; and
   after the free leg impacting the stepping location, locking the leg joints and locking the arm joints in a stretched position.

2. The computer-implemented method of claim 1, wherein the learned control parameters are learned in a machine learning algorithm to achieve a minimum realizable impact force of the robot resulting from the fall given the state of the robot following the determination that the fall cannot be prevented and given a limited set of controllable attributes of the robot.

3. The computer-implemented method of claim 1, wherein determining the state of the robot comprises:
   determining a generalized foot place estimator (GFPE) of the robot, the GFPE representing a location on the ground such that if the robot took a step to the location on the ground, the robot would reach a balanced position with its center of mass above the GFPE.

4. The computer-implemented method of claim 1, wherein the learned control parameters cause the robot to impact the ground with an arm substantially perpendicular to the ground.

5. The computer-implemented method of claim 1, further comprising performing a machine learning algorithm to learn the learned control parameters corresponding to the state of the robot, the machine learning algorithm including steps of:
   obtaining, for a first training state of the robot, initial control parameters for controlling the robot during the fall;
   adding noise to the obtained initial control parameters to determine new control parameters;
   controlling the robot during the fall using the new control parameters;
   obtaining a cost function based on estimated impact forces of the robot from the fall;
   updating the new control parameters based on the cost function to obtain updated control parameter; and
   using the updated control parameters as initial control parameters in a subsequent iteration of the machine learning stage.

6. The computer-implemented method of claim 5, further comprising:
   determining when a stopping criterion is reached; and
   storing final control parameters in association with the first training state of the robot.

7. A non-transitory computer-readable storage medium storing computer-executable instructions for controlling a robot during a fall to the ground, the instructions when executed by a processor causing the processor to perform steps including:
   determining a state of the robot following a determination that a fall cannot be prevented;
   mapping the state of the robot to learned control parameters corresponding to the state of the robot, the learned control parameters indicating a learned stepping location of a free leg, a learned left shoulder angle for controlling a position of the left arm, and a learned right shoulder angle for controlling a position of the right arm, wherein the learned control parameters control the robot to impact the ground with a foot of the free leg and two hands such that the robot reaches a balanced position supported by the foot and the two hands that prevents its torso from impacting the ground;
   controlling the robot during the fall based on the learned control parameters to take a step with the free leg to the learned stepping location, to control the left arm to achieve the learned left shoulder angle, and to control the right arm to achieve the learned right shoulder angle; and
   after the free leg impacting the stepping location, locking the leg joints and locking the arm joints in a stretched position.

8. The non-transitory computer-readable storage medium of claim 7, wherein the learned control parameters are learned in a machine learning algorithm to achieve a minimum realizable impact force of the robot resulting from the fall given the state of the robot following the determination that the fall cannot be prevented and given a limited set of controllable attributes of the robot.

9. The non-transitory computer-readable storage medium of claim 7, wherein determining the state of the robot comprises:

determining a generalized foot place estimator (GFPE) of the robot, the GFPE representing a location on the ground such that if the robot took a step to the location on the ground, the robot would reach a balanced position with its center of mass above the GFPE.

10. The non-transitory computer-readable storage medium of claim 7, wherein the learned control parameters cause the robot to impact the ground with an arm substantially perpendicular to the ground.

11. The non-transitory computer-readable storage medium of claim 7, further comprising instructions for performing a machine learning algorithm to learn the control parameters corresponding to the state of the robot, the machine learning algorithm including steps of:
   obtaining, for a first training state of the robot, initial control parameters for controlling the robot during the fall;
   adding noise to the obtained initial control parameters to determine new control parameters;
   controlling the robot during the fall using the new control parameters;
   obtaining a cost function based on estimated impact forces of the robot from the fall;
   updating the new control parameters based on the cost function to obtain updated control parameter; and
   using the updated control parameters as initial control parameters in a subsequent iteration of the machine learning stage.

12. The non-transitory computer-readable storage medium of claim 11, the instructions further comprising instructions for:
   determining when a stopping criterion is reached; and
   storing final control parameters in association with the first training state of the robot.

13. A system for controlling a robot during a fall to the ground, the system comprising:
   a processor; and
   a non-transitory computer-readable storage medium storing computer-executable instructions, the instructions when executed by the processor causing the processor to perform steps including:
      determining a state of the robot following a determination that a fall cannot be prevented;
      mapping the state of the robot to learned control parameters corresponding to the state of the robot, the learned control parameters indicating a learned stepping location of a free leg, a learned left shoulder angle for controlling a position of the left arm, and a learned right shoulder angle for controlling a position of the right arm, wherein the learned control parameters control the robot to impact the ground with a foot and two hands such that the robot reaches a balanced position supported by the foot and the two hands that prevents its torso from impacting the ground;
      controlling the robot during the fall based on the learned control parameters to take a step with the free leg to the learned stepping location, to control the left arm to achieve the learned left shoulder angle, and to control the right arm to achieve the learned right shoulder angle; and
      after the free leg impacting the stepping location, locking the leg joints and locking the arm joints in a stretched position.

14. The system of claim 13, wherein the learned control parameters are learned in a machine learning algorithm to achieve a minimum realizable impact force of the robot resulting from the fall given the state of the robot following the determination that the fall cannot be prevented and given a limited set of controllable attributes of the robot.

15. The system of claim 13, wherein determining the state of the robot comprises:
   determining a generalized foot place estimator (GFPE) of the robot, the GFPE representing a location on the ground such that if the robot took a step to the location on the ground, the robot would reach a balanced position with its center of mass above the GFPE.

16. The system of claim 13, wherein the learned control parameters cause the robot to impact the ground with an arm substantially perpendicular to the ground.

17. The system of claim 13, wherein the non-transitory computer-readable storage medium further stores instructions for performing a machine learning algorithm to learn the control parameters corresponding to the state of the robot, the machine learning algorithm including steps of:
   obtaining, for a first training state of the robot, initial control parameters for controlling the robot during the fall;
   adding noise to the obtained initial control parameters to determine new control parameters;
   controlling the robot during the fall using the new control parameters;
   obtaining a cost function based on estimated impact forces of the robot from the fall;
   updating the new control parameters based on the cost function to obtain updated control parameter; and
   using the updated control parameters as initial control parameters in a subsequent iteration of the machine learning stage.

* * * * *